(12) United States Patent
Ianakiev et al.

(10) Patent No.: US 7,902,517 B1
(45) Date of Patent: Mar. 8, 2011

(54) SEMICONDUCTOR NEUTRON DETECTOR

(75) Inventors: Kiril D. Ianakiev, Los Alamos, NM (US); Peter B. Littlewood, Cambridge (GB); Krastan B. Blagoev, Arlington, VA (US); Martyn T. Swinhoe, Los Alamos, NM (US); James L. Smith, Los Alamos, NM (US); Clair J. Sullivan, Los Alamos, NM (US); Boian S. Alexandrov, Los Alamos, NM (US); Jason Charles Lashley, Santa Fe, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 7 days.

(21) Appl. No.: 12/141,160

(22) Filed: Jun. 18, 2008

(51) Int. Cl.
*G01T 3/00* (2006.01)

(52) U.S. Cl. .................................. 250/390.01

(58) Field of Classification Search . 250/390.01–390.12
See application file for complete search history.

(56) References Cited

U.S. PATENT DOCUMENTS

| | | | |
|---|---|---|---|
| 3,227,876 A | 1/1966 | Ross | |
| 4,210,805 A | 7/1980 | Kobayashi et al. | |
| 4,266,132 A * | 5/1981 | Marshall, III | 250/359.1 |
| 4,270,051 A * | 5/1981 | Galkin et al. | 250/358.1 |
| 4,419,578 A | 12/1983 | Kress | |
| 4,667,107 A | 5/1987 | Wang | |
| 5,019,886 A | 5/1991 | Sato et al. | |
| 5,142,153 A | 8/1992 | Gomberg | |
| 5,204,527 A | 4/1993 | Buchanan | |
| 5,281,822 A | 1/1994 | Albrecht et al. | |
| 5,321,269 A | 6/1994 | Kitaguchi et al. | |
| 5,596,199 A * | 1/1997 | McNulty et al. | 250/370.07 |
| 5,707,879 A | 1/1998 | Reinitz | |
| 5,726,453 A | 3/1998 | Lott et al. | |
| 5,880,471 A | 3/1999 | Schelten et al. | |
| 5,940,460 A | 8/1999 | Seidel et al. | |
| 6,107,632 A | 8/2000 | Lind | |

(Continued)

FOREIGN PATENT DOCUMENTS

JP 06172078 A * 6/1994

OTHER PUBLICATIONS

Engels et al., "Thermal neutron detection with the Lithium Borate scintillator," 2000, IEEE Transactions on Nuclear Science, vol. 47, No. 3, pp. 948-951.*

(Continued)

*Primary Examiner* — David P Porta
*Assistant Examiner* — Kiho Kim
(74) *Attorney, Agent, or Firm* — Thomas S. O'Dwyer; James C. Durkis; John T. Lucas (57) ABSTRACT

A neutron detector has a compound of lithium in a single crystal form as a neutron sensor element. The lithium compound, containing improved charge transport properties, is either lithium niobate or lithium tantalate. The sensor element is in direct contact with a monitor that detects an electric current. A signal proportional to the electric current is produced and is calibrated to indicate the neutrons sensed. The neutron detector is particularly useful for detecting neutrons in a radiation environment. Such radiation environment may, e.g. include gamma radiation and noise.

35 Claims, 5 Drawing Sheets

U.S. PATENT DOCUMENTS

| | | |
|---|---|---|
| 6,388,260 B1 * | 5/2002 | Doty et al. ............... 250/390.01 |
| 6,545,281 B1 | 4/2003 | McGregor et al. |
| 6,624,423 B2 | 9/2003 | Leist et al. |
| 6,654,435 B1 | 11/2003 | Kronenberg et al. |
| 6,771,730 B1 | 8/2004 | Dowben et al. |
| 6,893,498 B1 * | 5/2005 | Miller et al. ....................... 117/2 |
| 7,034,307 B2 | 4/2006 | Sane et al. |
| 7,095,029 B2 * | 8/2006 | Katagiri .................. 250/390.11 |
| 7,372,009 B1 * | 5/2008 | Losee et al. ................... 250/200 |
| 2002/0121587 A1 | 9/2002 | Becht |
| 2003/0062486 A1 * | 4/2003 | Shimizu et al. ............ 250/483.1 |
| 2003/0164450 A1 | 9/2003 | Bruchhaus et al. |
| 2004/0178337 A1 | 9/2004 | Kurkoski et al. |
| 2004/0188627 A1 | 9/2004 | Panning |
| 2005/0023479 A1 * | 2/2005 | Grodzins ................. 250/390.11 |
| 2007/0085010 A1 * | 4/2007 | Letant et al. .............. 250/361 R |
| 2008/0003700 A1 * | 1/2008 | Wang et al. ....................... 438/3 |
| 2008/0315109 A1 * | 12/2008 | Stephan et al. .......... 250/390.01 |

OTHER PUBLICATIONS

Salavcova et al., "Study of anomalous behavior of LiTaO3 during the annealed proton exchange process of optical waveguide's formation—comparision with LiNbO3," 2007, Optical Materials, vol. 29. pp. 913-918.*

Cheng et al., "Inelastic neutron scattering of lithium tantalate studied in the ferroelectric and paraelectric phases," 1993, Journal of Physics: Condensed Matter, vol. 5, pp. 2707-2718.*

McGregor, Douglas S. et al.,"Spectral Identification of Thin-Film-Coated and Solid-Form Semiconductor Neutron Detectors", Nucl. Instr. & Meth. in Phys. Res., A517.2004, 180-188.

* cited by examiner

SEMICONDUCTOR NEUTRON DETECTOR

The United States Government has rights in this invention pursuant to Contract No. DE-AC52-06NA25396 between the United States Department of Energy National Nuclear Security Administration and Los Alamos National Security, LLC for the operation of Los Alamos National Laboratory.

BACKGROUND OF THE INVENTION

1. Field of the Invention

The invention relates to detection of neutrons and more specifically, it relates to a semiconductor neutron detector that utilizes a lithium compound as the sensing element.

2. Description of Related Art

Neutrons are uncharged elemental particles that do not provide direct energy transfer by ionizing matter as they pass through it. The velocity of neutrons increases with their energy. High energy neutrons interact with the light nuclei (H, He, Li) by transferring a fraction of their energy in multiple collisions (the so called recoil reaction) until they reach an energy close to thermal (0.026 eV). This process is called thermalization. The signal developed by this reaction is very weak and difficult to distinguish from the signal developed by gamma interaction, therefore this type of interaction usually is not used for neutron detection but only to slow down the neutrons to the thermal energy where the probability is very high for another process called capturing. The capturing process takes place in special stable isotopes of some materials such as He-3, Boron-10, Lithium-6 and Uranium-235, where the thermal neutron splits the absorber atom in two particles that will have kinetic energies in the MeV range and velocities in opposite directions. The percentage fraction of captured neutrons versus total accidental neutrons defines the capturing detection efficiency When the capturing of thermal neutron occurs, the charged particles produced by the capturing reaction transfer their energy by ionizing the capturing material and the charge collection material (gas or solid state semiconducting material) thus creating free charges. An applied electrical field separates the charges (electrons, holes and ions) and moves them toward the electrodes. The charge collected on the electrodes produces an electrical pulse signal with a given amplitude distribution (pulse height spectrum). An amplitude discriminator with an event detection threshold is used to separate the pulses of neutron origin from those originating from gamma or noise. The fraction of the pulses with amplitude above the detection threshold versus total neutron pulse height distribution defines the charge collection efficiency. The product of capturing and charge detection efficiency determines the overall intrinsic efficiency of the thermal neutron detector.

Some of the most popular thermal neutron detectors are gaseous detectors based on boron trifluoride ($BF_3$) or helium three ($^3He$). Here the capturing material is constituent in the gas molecule, therefore the same gas serves as a capturing medium as well as an ionization medium and a charge transport medium. The reaction particles deposit the whole energy in the gas volume thus providing near 100% charge collection efficiency. The combination of high capturing efficiency (typically about 70%) and high charge collection efficiency make these detectors a backbone of neutron detection technology.

Though boron trifluoride ($BF_3$) or helium-3 ($^3He$) gaseous detectors are very efficient, their application is limited by factors such as: a) high cost ($^3He$ is very expensive and is constantly depleted due to losses in the open space); b) difficulties for transportation because they are pressurized devices or use chemically aggressive $BF_3$ gas; and c) gaseous detectors are bulky and cannot address handheld and other special applications (some examples described below).

Solid state capturing materials such as B-10, Li-6, U-235 and Gd can be used as a thin film adjacent to the ionization and charge collection/charge transport medium. The thickness of the capturing layer, thus the capturing efficiency, is limited by self-absorption inside the capturing layer. The thin layer is applied as a film or a dopant.

Only a charge particle traveling toward the ionization medium can produce a signal and the signal amplitude depends of the energy absorption in the capturing layer. Thus both the neutron capturing and charges collection efficiency are limited substantially compared to a $^3He$ detector. Only a fraction of the charged particles deposit energy. The ionization medium can be a noble gas or solid state semiconductor material such as silicon, silicon carbide or germanium.

U.S. Pat. No. 3,227,876, incorporated herein by reference, is directed to a neutron detecting solid state device or the like. The patent discusses a silicon semiconductor having a layer doped with boron. Neutrons are absorbed by the boron layer, creating energetic reaction particles that, in turn, create electron-hole pairs that diffuse into and across the junction to produce an electric current pulse. The detector may be encapsulated by a few centimeters thick layer of hydrogenous moderator material in order to reduce the speed of incoming fast neutrons to create thermal neutrons for detection.

U.S. Pat. No. 6,388,260, incorporated herein by reference, is directed to a solid state neutron detector and method for use. The neutron detecting material is a lithium tetraborate or alpha-barium borate crystal. Neutrons are absorbed by the boron layer to create energetic reaction particles that create electron-hole pairs. The electron-hole pairs diffuse into and across the junction to produce a current pulse.

A problem with prior art neutron detectors is the sensitivity of the detector to gamma rays. Lithium glass scintillators, although generally less efficient, are an effective means for detecting low-energy neutrons and find wide application in neutron scattering research. However, lithium glass scintillators also suffer from sensitivity to gamma rays where the presence of a background radiation is large in relationship to a flux of neutrons. In such instances, the gamma sensitivity of lithium glass simulates a neutron capture event in lithium glass and there is no effective technique for separating the gamma signal from the neutron signal.

SUMMARY OF THE INVENTION

It is an object of the present invention to provide a neutron detector that combines the efficiency and pulse height distribution of $^3He$ detectors with the compactness and low cost of semiconductor detectors.

It is another object of the invention is to provide a semiconductor neutron detector that includes a sensor element that is a lithium compound in a single crystal form.

Another object is to provide a neutron detector in which an energy pulse (i.e., an ionization charge) is produced by the conversion of a fast neutron to a thermal neutron within the crystal lattice of the detector element.

Still another object is to provide a neutron detector that includes an sensor element formed from either lithium niobate or lithium tantalate.

Another object is to isotopically enhance a lithium compound to improve its performance as a sensor element of a neutron detector.

Another object is to provide a method for detecting neutrons.

These and other objects will be apparent to those skilled in the art based on the teachings herein.

The invention is a neutron detector having a compound of lithium in single crystal form as a neutron sensor. A monitor is in direct contact with the sensor and functions to detect electric current. A signal proportional to the electric current is produced and is calibrated to indicate the neutrons sensed. The invention is particularly useful for detecting neutrons in a radiation environment. Such radiation environment may, e.g., include gamma radiation and noise.

Neutrons detectors convert fast neutrons to detectable thermal neutrons. The semiconductor crystal lattice of the lithium compound of the present invention performs the thermal neutron conversion. The entire ionization charge produced on capture is within the active region of the sensor because neutron absorption occurs within the semiconductor crystal. The neutron absorption reaction produces the energy pulse in the sensor.

Exemplary embodiments of the present invention utilize a semiconductor crystal made from either lithium niobate ($LiNbO_3$) or lithium tantalate ($LiTaO_3$). Lithium niobate and lithium tantalite are wide band gap materials. They display negligible current leakage even at elevated room temperature and surface areas of hundreds of centimeters. Charge collection time on the order of micro seconds can be tolerated. The charge produced by the neutron reaction products is on the order of about 20 to 30 fC/neutron, which is above the energy level of electronic noise and gamma rays so that the neutron signals can be distinguished by an electronic gate.

The fast neutron detection performance of the detector may be improved by coating or encapsulating the crystal in a moderator. The hydrogenous moderator material needs only be a few centimeters thick. Directional sensing may be obtained by an array consisting of a repeated sandwich of moderator and sensor.

Other features and advantages of the invention will be set forth in, or apparent from, the following detailed description of the invention.

BRIEF DESCRIPTION OF THE DRAWINGS

The accompanying drawings, which are incorporated into and form a part of the disclosure, illustrate embodiments of the invention and, together with the description, serve to explain the principles of the invention. The drawings, inter alia, describe embodiments of the invention and are provided for illustrative purposes and should not be construed as limiting in any manner.

DETAILED DESCRIPTION OF THE INVENTION

The invention is a neutron detector. Thermal neutrons are free neutrons having a kinetic energy on the order of about 0.025 electron volts (eV). This kinetic energy level corresponds with a neutron speed on the order of about 2.2 kilometers/second (km/s). Fast neutrons are free neutrons having a kinetic energy on the order of about 1 million electron volts (MeV). This kinetic energy level corresponds with a neutron speed on the order of about 14,000 km/s.

Neutrons detectors provide a means for converting fast neutrons to thermal neutrons and then detecting the thermal neutrons. The present invention is semiconductor in which the thermal neutron conversion means is the semiconductor crystal lattice. Because neutron absorption occurs within the semiconductor crystal, the entire ionization charge produced on capture is within the active region of the sensor. The energy pulse from the neutron absorption reaction originates in the sensor. The threshold of this energy pulse is narrow. Energy received outside the fast neutron threshold can be excluded.

Exemplary embodiments of the present invention utilize a semiconductor crystal made from either lithium niobate ($LiNbO_3$) or lithium tantalate ($LiTaO_3$). A high $Li^6$-isotope-content crystal has advantages over one made from naturally occurring lithium. An embodiment uses a thin crystal of lithium niobate that has a $Li^6$ content of 95%. A crystal only a few millimeters thick absorbs essentially all thermal neutrons contacting it. This absorption by $Li^6$ causes a release of charged particles and 4.78 MeV of energy according to the neutron capture reaction:

$$neutron + Li^6 \rightarrow H^3 (2.73 \text{ MeV}) + He^4 (2.05 \text{ MeV}).$$

The energy carried by triton ($^3H$) and alpha ($^4He$) reaction particles in the crystal lattice ionizes one or more of the surrounding atoms and thereby creates electron-hole pairs. These positive and negative charge carriers are free to move and, because of their differing charges, migrate in opposite directions.

A high voltage bias (hundreds of volts) is applied to the crystal. Under the influence of the applied voltage bias, each charge carrier moves toward an electrode. Biasing the crystal causes essentially complete and rapid migration of electrons to the electrodes and almost fully depletes the crystal of charge. The electron-hole pairs are detected as a small step change in voltage at an electrode. The electrode is applied by metallizing a crystal face.

A positively charged hole is created by the electron departing the crystal lattice for each negatively charged electron that is promoted from the lithium ion. Charge neutrality is maintained by the creation of electron-hole pairs. Because of the ease with which electrons migrate in these crystals, electrons can move to fill a hole and thereby create a second hole at a position in the crystal lattice removed from the first. Therefore, holes move through the crystal lattice of the semiconductor much like excited electrons such that both electrons and holes conduct current.

The small step change is passed to a preamplifier where it is amplified and then to a pulse shaping amplifier where the signal is integrated to form a shape pulse having a height proportional to the relative energy.

Lithium niobate and lithium tantalite are wide band gap materials. The reported band gap of lithium niobate is 3.56 eV. They display negligible current leakage even at elevated room temperature and surface areas of hundreds of centimeters. The dominant noise produced by these crystals is serial noise so the optimal signal-to-noise ratio requires use of long shaping time constants. Therefore, charge collection time on the order of micro seconds can be tolerated. The charge produced by the neutron reaction products is on the order of about 20 to 30 fC/neutron. This is sufficiently above the energy level of electronic noise and gamma rays so that the neutron signals can be distinguished by an electronic gate.

Signals of 30 mV are produced by means of conventional signal processing. Output pulses from the shaping amplifier are optionally passed to a digitizer, and multi-channel analyzer which digitizes the pulse height of each of the signal pulses and accumulates each of the digital signals in channel numbers corresponding to the magnitude of the digitized signal. The signal spectrum output of the multi-channel analyzer consists of one or more broad peaks, corresponding to the energies of the neutron capture reaction. This can be displayed graphically on an oscilloscope or some other display means.

The reaction mechanism of the invention is similar to that of the early ionization chamber. The advantage of the invention is the efficiency discovered in the solid state semiconductor material. The density of $Li^6$ in the crystal lattice gives higher detection efficiency in a smaller volume. The selection of the semiconductor materials of the invention shows improved efficiency over solid state neutron sensors of the prior art.

Figure 1:
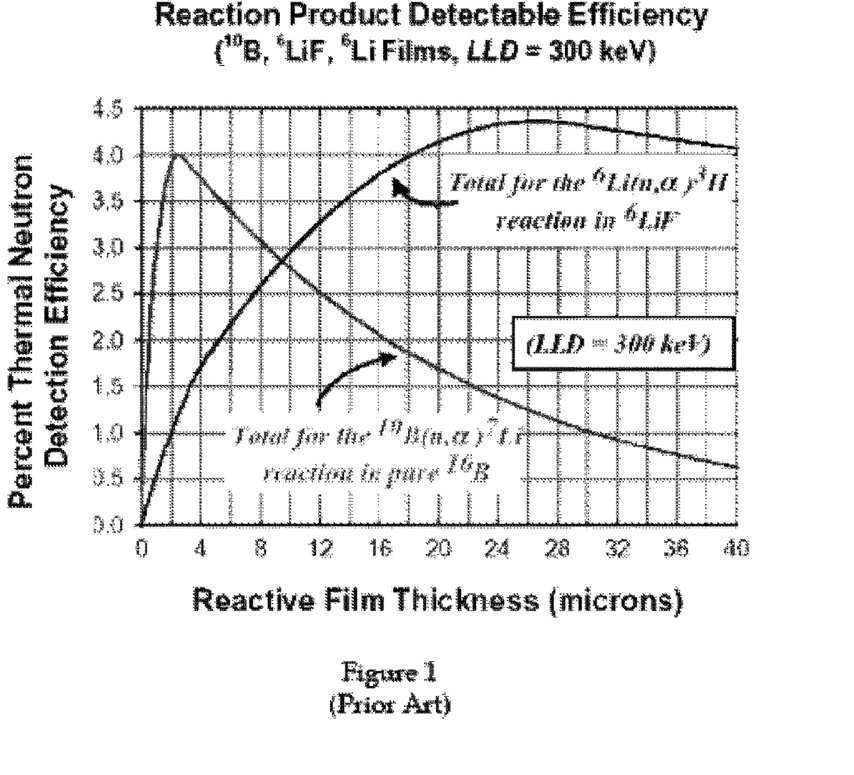
FIG. 1 is a plot of the thermal neutron detecting efficiency of a neutron detector of the prior art.

FIG. 1 is a plot of calculated thermal neutron detecting efficiency of $^{10}B$ and $^6LiF$ capturing film neutron detectors of the prior art. The detection efficiency of a crystal increases with thickness. Coating a neutron absorbing material onto one face of a semiconductor produces an improvement of at least one order of magnitude in detection efficiency.

Figure 2A:
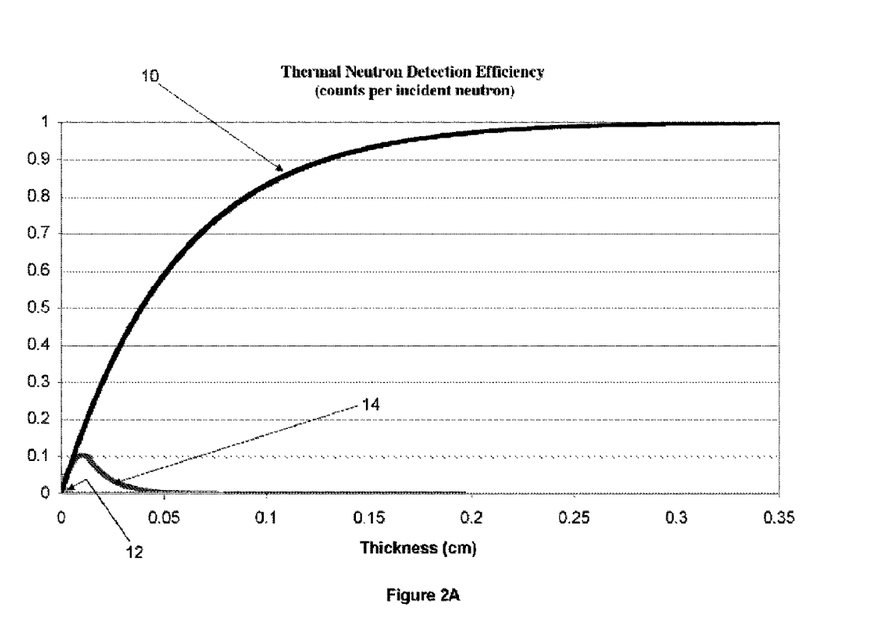
FIG. 2A is a plot of the thermal neutron detecting efficiency of an embodiment of a lithium niobate neutron detector of the present invention.
Figure 2B:
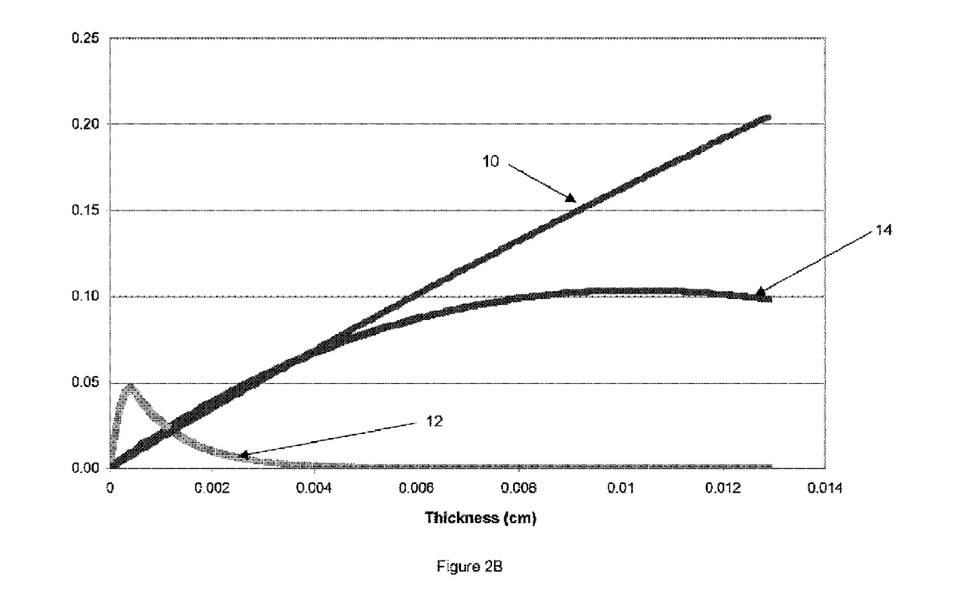
FIG. 2B is a magnified view of the plot of FIG. 2A.

FIG. 2A shows plot 10 of calculated thermal neutron detecting efficiency of a lithium niobate neutron detector of an embodiment of the present invention. FIG. 2B is a magnified view of FIG. 2A and shows plots 12 and 14 of the efficiencies of prior art technology of $^{10}B$ and $^6LiF$ capturing films respectively.

Lithium niobate and lithium tantalate are wide gap semiconductors that are easily crystallized into large, single crystals. They are commercially available with a crystal face of several square centimeters. They are also available in film form. These crystals are ferroelectric and piezoelectric. That is, they have inherent electrical polarity at room temperature and the polarization may be changed or induced by elastic strain. They display a photovoltaic effect, developing an internal electric field by the charge separation of optically excited electron-hole pairs. Optical photocurrents are produced by a bulk photovoltaic effect with saturation voltages on the order of 1 kV and field fluxes of up to about $10^5$ V/cm. Thin films of these materials display a response time in the order of tens of nanoseconds.

Lithium niobate single crystals are available as 5 inch diameter wafers. The literature reports charge mobility of up to 800 $cm^2/V/s$. The charge collection time for planar geometry is defined by the equation:

$$t=d/(\mu_e*E)$$

where t is the charge collection time in seconds, d is the thickness of the crystal in cm, $\mu_e$ is the electron mobility in $cm^2$/volts/seconds and E is the field intensity in volts/cm. Due to the low leakage current and high capacitance, longer shaping times are advantageous.

By way of example, an electron mobility of 100 $cm^2$/volts/seconds will give a charge collection time of 1 micro second even at the moderate field intensity of 1 kV/cm. The operational parameters of the detector and electronics allow the charge collection time to be a few times longer than this and allow the field intensity to be a few times higher. Even lower mobility than this would still provide satisfactory performance.

Commercially available crystals of lithium niobate and lithium tantalate contain defects and impurities that can limit the electronic transport. By annealing and/or doping the crystals, the mobility of charge carriers can be modified to improve the performance of the device. Thermal annealing by vapor transport equilibration reduces the natural non-stoichiometry of congruently grown crystals and increases the mobility. Annealing the crystals in a reducing atmosphere also increases the mobility. Specifically, the commercial crystals were doped with iodine or with hydrogen. For the iodine doped samples, the niobate crystals were sealed with 0.3 mol % iodine crystals under vacuum in a quartz tube. The samples were reacted at 350 degrees C. for one hour. The samples appear to have a red tint after the reaction. For the hydrogen reaction, the niobate crystals were backfilled with an Ar 94% and hydrogen 6% gas mixture and sealed. Samples were reacted at 350 degrees C. for 1 hour.

An effect of the nonstoichiometry of congruently grown crystals is that the lithium deficient in LiNbO and LiTaO causes deep electronic traps in these kinds of crystals. These traps can very quickly collect the released charge from a radiation event. Even in the non-congruent crystals, and after the Li vapor transport equilibration, there remains a significant presence of these defects for the charge transport. The influence of these traps can be eliminated by further annealing the crystals in a hydrogen or a neutral atmosphere, or in a vacuum. When LiNbO or LiTaO crystals are heated for a few hours at over 600 to 700 degrees C. in a hydrogen atmosphere, or in similar conditions in a vacuum, these deep traps can be filled. The electrons required for recharging of the Nb(Ta) ions are created as a result of the process:

$$2O_2^- \rightarrow O_2 + 2O_{Vacancies} + 4e^-.$$

Experimentally, the oxygen reduction also caused an increase in electrical conductivity, a change of the color of the crystals, an increase of the mobility and the appearance of additional optical band absorption (due to the creation of the oxygen vacancies).

The fast neutron detection performance of the detector may be improved by coating or encapsulating the crystal in a moderator. The hydrogenous moderator material needs only be a few centimeters thick. Directional sensing may be obtained by an array consisting of a repeated sandwich of moderator and sensor.

The following examples describe embodiments of the invention and are provided for illustrative purposes and should not be construed as limiting in any manner.

EXAMPLE 1

Figure 3:
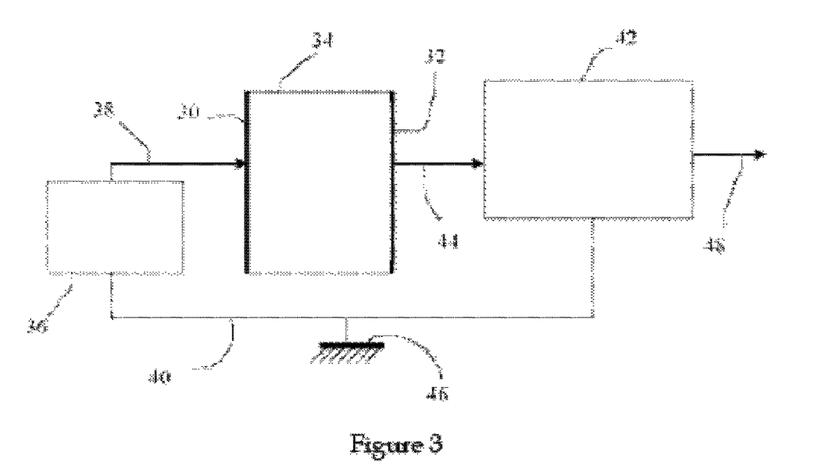
FIG. 3 is a diagram of the elements of an embodiment of a lithium niobate neutron detector of the present invention.

FIG. 3 is a diagram of the elements of an embodiment of a lithium niobate neutron detector of the present invention. Electrical contacts 30 and 32 are applied to a bulk material 34 of doped lithium niobate ($LiNbO_3$). A direct current power supply 36 is connected by lead 38 to contact 30 and by lead 40 to charge sensitive preamplifier 42 to lead 44 to contact 32 to provide an external bias voltage to bulk material 34. Lead 40 is also connected to a ground 46. Charge sensitive preamplifier 42 provides an output voltage from lead 48. In this embodiment, a positive voltage is applied to contact 30 and a negative voltage is applied to contact 32. This embodiment can be modified, e.g., by substituting lithium tantalate for the lithium niobate.

EXAMPLE 2

The configuration of FIG. 3 can be used for improved detection of fast neutrons by surrounding the thermal neutron detector bulk material 34 with a moderating material. Exemplary materials for use as a moderator include hydrogenous material and specifically polyethylene. Another embodiment interposes a moderating material between a neutron source and thermal neutron detector bulk material 34. This enables the present detector to be used in configurations very similar to those currently used, but in addition, the size and shape of the new semiconductor detector allows new geometrical configurations that are not possible with existing thermal neutron detection elements.

EXAMPLE 3

Figure 4:
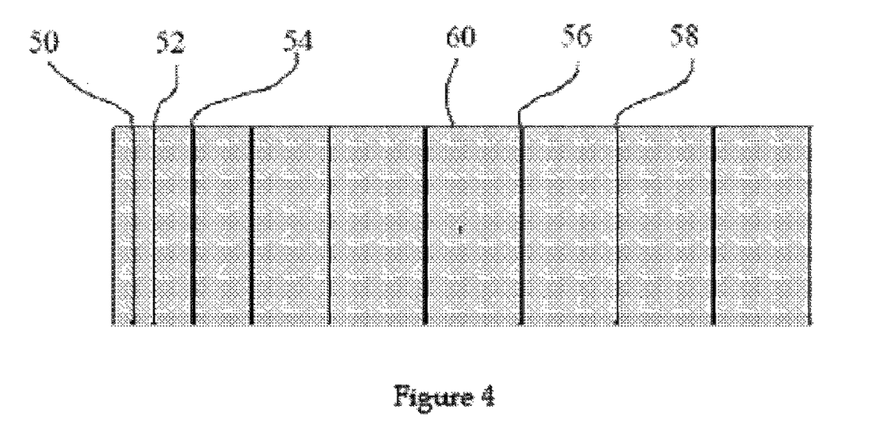
FIG. 4 illustrates LiNbO3 detection elements embedded in a polyethylene moderator.
Figure 5:
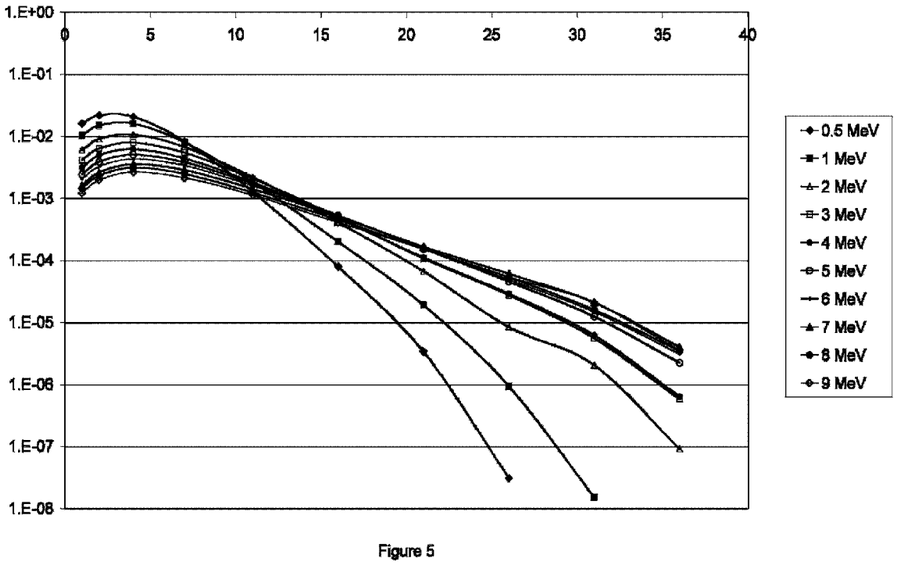
FIG. 5 plots the counting rate for the LiNbO3 elements as a function of neutron energy.

The small thickness of the detector enables the construction of a device for neutron spectrometry, in which detection elements are placed at various depths in a moderating material. FIG. 4 shows $LiNbO_3$ detection elements 50, 52, 54, 56, and 58 embedded in polyethylene moderator 60. The neutron source could be located to the left or to the right of the figure. FIG. 5 provides a plot of the relative counting rate for different embedded detection elements as a function of incident neutron energy. These counting rates should allow an estimate of the incident neutron spectrum.

EXAMPLE 4

Figure 6:
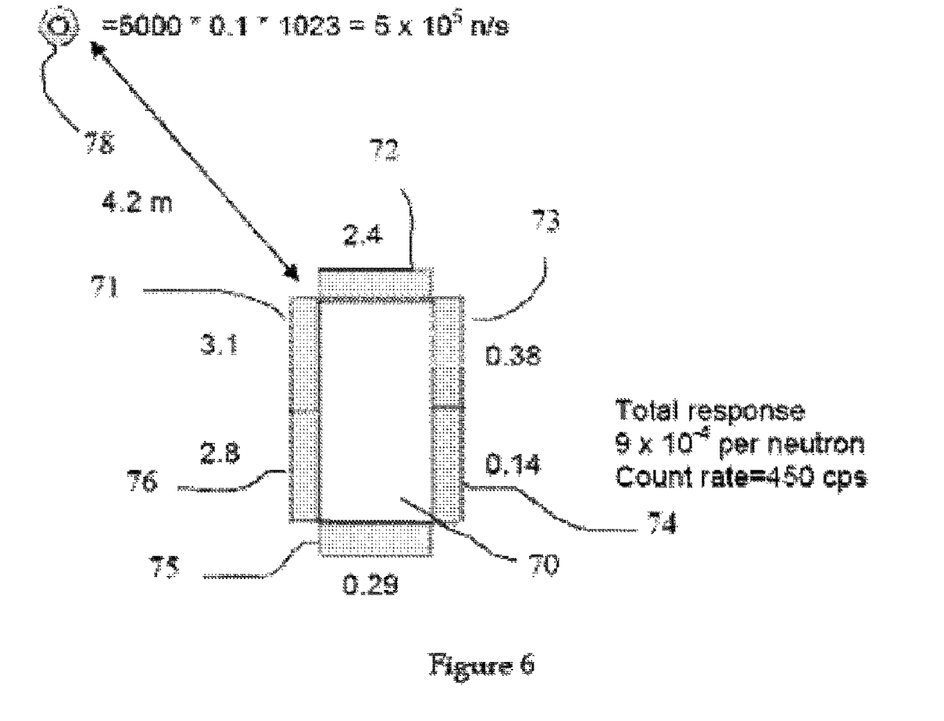
FIG. 6 illustrates panels of neutron detection material in proximity to a neutron source.

The size of the detector enables a fast neutron detection "vest", in which thin sheets of thermal neutron detector material are used and the moderation of the fast neutrons is provided by the hydrogen content of the wearer of the "vest". FIG. 6 shows a sketch of such a system. Initial calculations, using water 70 to represent a human body, show that the counting rate in the different detection elements 71-76 of the vest would give information about the direction of the source 78 of incident neutrons, such that a way to locate the neutron source is enabled. The numbers represent the relative count-rates in the detection elements due to 5 kg of weapons grade Pu (surrounded with moderator) located at a distance of 4.2 meters. A line drawn from the direction of the sheet of thermal neutron detector material having the lowest relative count rate to the sheet of thermal neutron detector material having the highest relative count rate will indicate the general direction of the neutron source.

A basic form of the invention is a neutron detector that includes a sensor element of a lithium compound in a single crystal form; an electronic circuit in electrical contact with the sensor element, the electronic circuit capable of detecting an energy pulse produced from the absorption of a neutron in the crystal lattice of the lithium compound; and means for measuring the energy pulse. The energy pulse is an ionization charge and is produced by the conversion of a fast neutron to a thermal neutron within the crystal lattice. The lithium compound can be either lithium niobate or lithium tantalate. By isotopically enhancing the lithium compound, the neutron detector performance is improved. In one embodiment, the lithium compound is isotopically enhanced with $^6$Li. and may have a $Li^6$ content of 95%. To deplete the sensor element, it is electrically biased. In some embodiments, the lithium compound includes a dopant, which may be iodine or hydrogen. In some embodiments, the lithium compound is annealed. A moderator may be adhered to at least a portion of the lithium compound. This moderator may be a hydrogenous material in some embodiments, and specifically may be polyethylene.

In nuclear engineering, a neutron moderator is a medium which reduces the velocity of fast neutrons, thereby turning them into thermal neutrons capable of sustaining a nuclear chain reaction involving uranium-235. Commonly used moderators include deuterium (as heavy water), hydrogen (as ordinary or light water) and graphite. Beryllium has also been used in some experimental types, and hydrocarbons have been suggested as another possibility. A good neutron moderator is a material full of atoms with light nuclei which do not easily absorb neutrons. The neutrons strike the nuclei and bounce off. In this process, some energy is transferred between the nucleus and the neutron. More energy is transferred per collision if the nucleus is lighter. After sufficiently many such impacts, the velocity of the neutron will be comparable to the thermal velocities of the nuclei; this neutron is then called a thermal neutron. Some of the materials used as moderators in nuclear reactors include: (i) hydrogen, (ii) deuterium, in the form of heavy water, (iii) carbon, in the form of reactor-grade graphite or pyrolytic carbon, (iv) beryllium, in the form of metal, and (v) lithium-7, in the form of a fluoride salt, typically in conjunction with beryllium fluoride salt (FLiBe). Other light-nuclei materials are unsuitable for various reasons.

In some embodiments, a number of sensor elements are distributed in a moderator. The sensor elements may be directionally aligned such that a neutron could sequentially propagate through them and moderator material is located between each sensor element. In some embodiments, sensor element are configured to be worn by a human. The invention contemplates methods for using the various embodiments of neutron detectors taught in this disclosure. Other neutron detectors and methods for detecting neutrons will be apparent to those skilled in the art based on the disclosure herein.

The foregoing discussion discloses and describes embodiments of the present invention by way of example. One skilled in the art will readily recognize from this discussion and from the accompanying drawings and claims, that various changes, modifications and variations can be made therein without departing from the spirit and scope of the invention as defined in the following claims.

We claim:
1. A neutron detector, comprising:
a sensor element comprising a lithium compound in a single crystal form that is selected from the group consisting of lithium niobate and lithium tantalate which possesses improved charge transport properties that are achieved by doping said crystal;
an electronic circuit in electrical contact with said sensor element, said electronic circuit capable of detecting an energy pulse produced from the absorption of at least one neutron in the crystal lattice of said lithium compound; and
means for measuring said energy pulse.

2. The neutron detector of claim 1, wherein said energy pulse is produced by the conversion of a fast neutron to a thermal neutron within said crystal lattice, wherein said energy pulse comprises an ionization charge.

3. The neutron detector of claim 1, wherein the charge transport properties of said lithium compound are improved by vapor transport equilibration achieved through thermal annealing in addition to doping said crystal.

4. The neutron detector of claim 3, wherein said the improved charge transport properties of said lithium compound is accomplished by annealing said crystal in a reducing atmosphere.

5. The neutron detector of claim 1, wherein said lithium compound is isotopically enhanced with $^6$Li.

6. The neutron detector of claim 1, wherein said lithium compound comprises a $^6$Li content of 95%.

7. The neutron detector of claim 1, further comprising means for electrically biasing said sensor element.

8. The neutron detector of claim 1, wherein said doping is accomplished by selecting a dopant from the group consisting of iodine and hydrogen.

9. The neutron detector of claim 1, wherein at least one dopant is sealed with said crystal and reacted at 350° degrees C. for one hour.

10. The neutron detector of claim 1, further comprising a moderator adhered to at least a portion of said lithium compound.

11. The neutron detector of claim 10, wherein said moderator comprises a hydrogenous material.

12. The neutron detector of claim 10, wherein said moderator comprises polyethylene.

13. The neutron detector of claim 1, wherein said detector further comprises a plurality of additional sensor elements, wherein said detector further comprises a moderator, wherein said plurality of additional sensor elements are distributed at various depths within the moderating material.

14. The neutron detector of claim 1, further comprising a plurality of secondary sensor elements, wherein each secondary sensor element of said plurality of sensor elements comprises a lithium compound in a single crystal form, wherein said detector further comprises a plurality of sections of moderator material, wherein said sensor element and each said secondary sensor element are directionally aligned such that a neutron could sequentially propagate through said sensor element and each said secondary sensor element, and wherein at least one section of said plurality of sections of moderator material is located between said sensor element and each said secondary sensor element.

15. The neutron detector of claim 14, further comprising means for detecting a secondary energy pulse produced from the absorption of said at least one neutron in at least one said secondary sensor element, and wherein said neutron detector further comprises secondary means for measuring said secondary energy pulse.

16. The neutron detector of claim 1, further comprising a plurality of secondary sensor elements, wherein said secondary sensor elements comprise a lithium compound in a single crystal form, wherein each said secondary sensor element comprises means for detecting and measuring a secondary energy pulse, wherein said sensor element and said secondary sensor elements are configured to be worn by a human.

17. The neutron detector of claim 16, wherein said secondary sensor elements comprise material selected from the group consisting of lithium niobate and lithium tantalate.

18. The neutron detector of claim 1, wherein said single crystal form of lithium compound is presented in a crystal face, face array, thin film, wafer configuration, or combination thereof, when employed as a sensor element.

19. A method for detecting a neutron, comprising:
providing a sensor element comprising a lithium compound in a single crystal form that is selected from the group consisting of lithium niobate and lithium tantalate which possesses improved charge transport properties that are achieved by doping said crystal;
electrically contacting an electronic circuit with said sensor element, wherein said electronic circuit is capable of detecting an energy pulse produced from the absorption of at least one neutron in the crystal lattice of said lithium compound; and
measuring said energy pulse.

20. The method of claim 19, wherein said energy pulse is produced by the conversion of a fast neutron to a thermal neutron within said crystal lattice, wherein said energy pulse comprises an ionization charge.

21. The neutron detector of claim 19, wherein the charge transport properties of said lithium compound are improved by vapor transport equilibration achieved through thermal annealing in addition to doping said crystal.

22. The neutron detector of claim 21, wherein said the improved charge transport properties of said lithium compound is accomplished by annealing said crystal in a reducing atmosphere.

23. The method of claim 19, wherein said lithium compound is isotopically enhanced with $^6$Li.

24. The method of claim 19, wherein said lithium compound comprises a $^6$Li content of 95%.

25. The method of claim 19, further comprising means for electrically biasing said sensor element.

26. The method of claim 19, wherein said doping is accomplished by selecting a dopant from the group consisting of iodine and hydrogen.

27. The neutron detector of claim 19, wherein at least one dopants is sealed with said crystal and reacted at 350° degrees C. for one hour.

28. The method of claim 19, further comprising a moderator adhered to at least a portion of said lithium compound.

29. The method of claim 28, wherein said moderator comprises a hydrogenous material.

30. The method of claim 28, wherein said moderator comprises polyethylene.

31. The method of claim 19, wherein said detector further comprises a plurality of additional sensor elements, wherein said detector further comprises a moderator, wherein said plurality of additional sensor elements are distributed at various depths within the moderating material.

32. The method of claim 19, further comprising a plurality of secondary sensor elements, wherein each secondary sensor element of said plurality of sensor elements comprises a lithium compound in a single crystal form, wherein said detector further comprises a plurality of sections of moderator material, wherein said sensor element and each said secondary sensor element are directionally aligned such that a neutron could sequentially propagate through said sensor element and each said secondary sensor element, and wherein at least one section of said plurality of sections of moderator material is located between said sensor element and each said secondary sensor element.

33. The method of claim 32, further comprising means for detecting a secondary energy pulse produced from the absorption of said at least one neutron in at least one said secondary sensor element, and wherein said neutron detector further comprises secondary means for measuring said secondary energy pulse.

34. The method of claim 19, further comprising a plurality of secondary sensor elements, wherein said secondary sensor elements comprise a lithium compound in a single crystal form, wherein each said secondary sensor element comprises means for detecting and measuring a secondary energy pulse, wherein said sensor element and said secondary sensor elements are configured to be worn by a human.

35. The method of claim 34, wherein said secondary sensor elements comprise material selected from the group consisting of lithium niobate and lithium tantalate.

* * * * *